(12) United States Patent
Ueno

(10) Patent No.: US 6,805,416 B2
(45) Date of Patent: Oct. 19, 2004

(54) CORE BAR FOR RUBBER CRAWLER AND RUBBER CRAWLER

(75) Inventor: Yoshio Ueno, Kishiwada (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 9 days.

(21) Appl. No.: 10/196,227

(22) Filed: Jul. 17, 2002

(65) Prior Publication Data

US 2003/0025391 A1 Feb. 6, 2003

(30) Foreign Application Priority Data

Aug. 6, 2001 (JP) ........................................ 2001-238370

(51) Int. Cl.[7] .............................................. B62D 55/24
(52) U.S. Cl. ........................ 305/177; 305/171; 305/174
(58) Field of Search ................................ 305/177, 167, 305/170–171, 173–176, 193, 195, 172

(56) References Cited

U.S. PATENT DOCUMENTS 5,308,155 A * 5/1994 Katoh ........................ 305/174
5,399,003 A * 3/1995 Katoh ........................ 305/171
5,403,643 A * 4/1995 Tsuru ........................ 428/120

FOREIGN PATENT DOCUMENTS

| EP | 0 300 488 A | 1/1989 |
| EP | 0 495 122 A | 7/1992 |
| EP | 0 497 597 A | 8/1992 |
| JP | 61-122085 A | 6/1986 |
| JP | 7-17658 | 4/1995 |

* cited by examiner

Primary Examiner—Russell D. Stormer
Assistant Examiner—Jason R. Bellinger
(74) Attorney, Agent, or Firm—Nixon Peabody LLP; David S. Safran

(57) ABSTRACT

A core bar for a rubber crawler includes: right and left wing parts; an engaging part for connecting the wing parts; right and left protrusions to guide a rolling wheel; and right and left outside rails that are formed on outer sides of the right and left protrusions, respectively, and have overhanging parts extending in the widthwise direction of the wing part. The overhanging part is formed on an edge portion thereof with a surface that slants downward from a top surface of the outside rail.

9 Claims, 10 Drawing Sheets

FIG.14A
FIG.14B
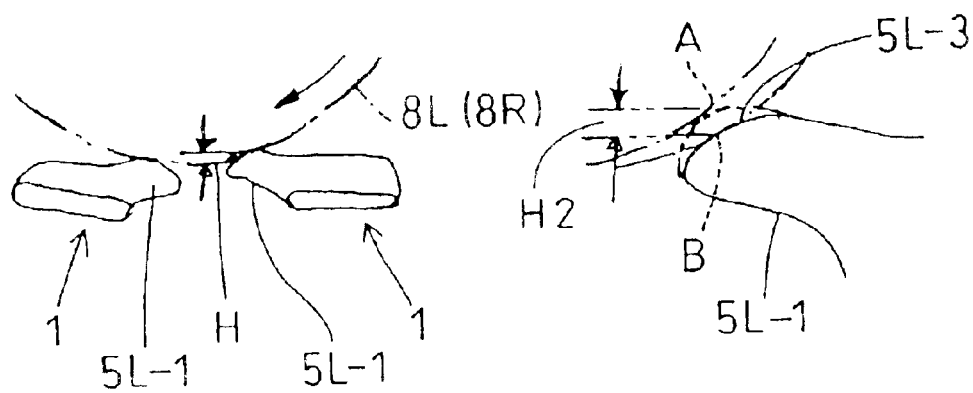
FIG.15
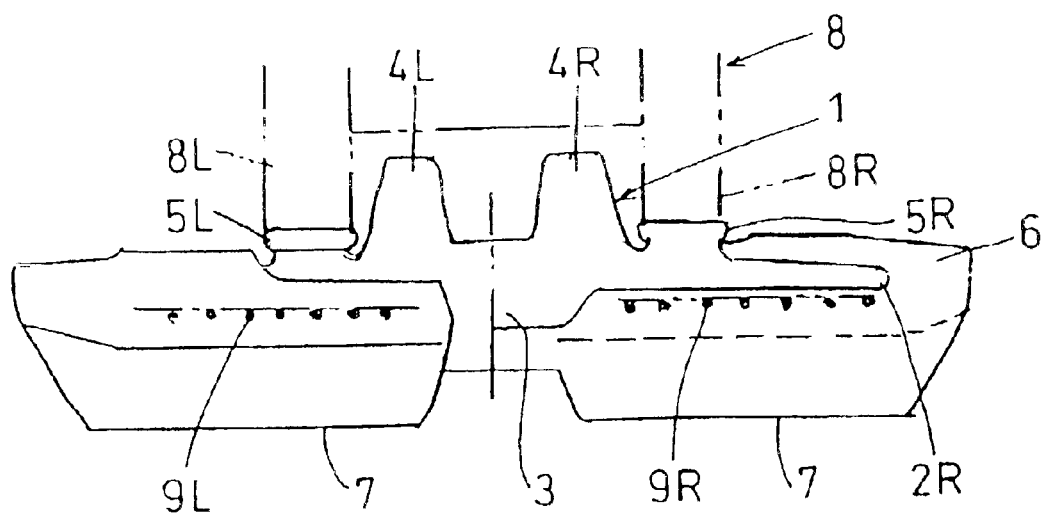

CORE BAR FOR RUBBER CRAWLER AND RUBBER CRAWLER

BACKGROUND OF THE INVENTION

1. Field of the Invention

The present invention relates to a core bar for a rubber crawler and a rubber crawler used for a farm machine, a construction machine and the like and, to be more specific, to an outside rail type rubber crawler.

2. Description of the Related Art

In Japanese Examined Utility Model Publication No. HEI 7-17658, there is proposed a core bar for a rubber crawler having a pair of angular protruding parts (protrusions for preventing the coming-off of a rolling wheel) formed on both sides of an engaging part at the center between right and left wing parts, on outer side of each of the angular parts described above is formed a shoulder part (outside rail) elevated with respect to the wing parts of the core bar, wherein the respective shoulder parts are formed with overhanging parts that overhang in the front-rear direction (in the widthwise direction of the wing part), and wherein the top surfaces of the respective shoulder parts are slanted upward from the center to the end portions of the front and rear overhanging parts; and a crawler in which the core bars for a rubber crawler are embedded in a rubber crawler body with the top surfaces (rail surfaces) of the shoulder parts described above exposed on the inner circumferential surface of the rubber crawler so that the top surfaces of the shoulder parts form a rolling wheel track against which the outside collars of an outside collar type rolling wheel are abutted.

According to the related art described above, when the overhanging part is sunk, it is brought closer to an adjacent shoulder part (outside rail) in the circumferential direction (in the lengthwise direction) of the crawler to narrow the distance between the core bars, so that the rolling wheel track is made nearly continuous in the circumferential direction, thereby reducing vibrations as much as possible.

However, since the sinking of the overhanging part increases the height difference between the adjacent overhanging parts in the circumferential direction of the crawler and, when the rolling wheel is transferred to the next overhanging part, the rolling wheel collides with the next overhanging part causing noises and vibrations.

In particular, in a truck loader, a vibration roller, a bulldozer or the like, which mostly runs at comparatively high speeds, the collision of the rolling wheel with the overhanging parts tends to cause large noises and damages the overhanging part or the rolling wheel.

SUMMARY OF THE INVENTION

The present invention has been made to solve these kinds of problems in the related art. It is, therefore, an object of the present invention to provide a core bar for an outside rail type rubber crawler that is capable of reducing height differences between the adjacent overhanging parts and collisions between the rolling wheel and the overhanging part which are caused by sinking of the overhanging part due to a transfer of the rolling wheel from one overhanging part to the next one, and a rubber crawler in which such core bars are embedded.

The present invention provides an outside rail type core bar capable of substantially reducing collision noises caused by a rolling wheel and suppressing damage accompanied by the collision, and an outside rail type rubber crawler using such core bars, and thus, is advantageous in that it solves the problems described above in the related art.

A core bar for a rubber crawler in accordance with the present invention includes an engaging part which connects a right wing part with a left wing part, right and left protrusions formed on the right and left sides of the engaging part in the lengthwise direction of the core bar for guiding a rolling wheel, and right and left outside rails formed on the outer sides of the right and left protrusions with respect to a center of the core bar in the lengthwise direction thereof and formed with overhanging parts overhanging in the widthwise direction of the wing part.

The core bar for a rubber crawler of the present invention is characterized in that each of the overhanging parts has a front or rear edge portion on the top surface, the top surface being formed with a surface that slants downward from a rail surface of the outside rail.

When the rolling wheel is transferred to the rail surface of the next outside rail, this constitution makes it possible for the rolling wheel to be transferred on a nearly horizontal flat surface, even if the overhanging part has sunk, thereby avoiding the rolling wheel from colliding with the overhanging part, and thus, ensuring a smooth transfer.

In a preferable embodiment, it is recommended that each of the right and left outside rails has an overhanging part extending only on one of the front and the rear sides thereof in the widthwise direction of the wing part and that the overhanging parts of the right and left outside rails are arranged to extend on the opposite sides to each other.

Further, it is recommended that each of the right and left outside rails have overhanging parts on both the front and the rear sides in the widthwise direction of the wing part and that the overhanging parts of the right and left outside rails are equal or different in length to or from each other, so that the right and left outside rails are equal or different in length to or from each other.

Still further, it is recommended that each of the rail surfaces of the right and left outside rails is formed, in the lengthwise direction of the rail, in a horizontally extending flat surface, in a flat surface slanting upward from one end of the rail to the other end thereof including the overhanging part, or in a concavely curved surface slanting upward from a center toward opposite ends of the rail.

Still further, a rubber crawler in accordance with the present invention, in which the above-mentioned core bars for a rubber crawler are embedded, is characterized in that the core bars for a rubber crawler are embedded in a rubber crawler body with the rail surfaces of the right and left outside rails exposed on the inner circumferential surface of the rubber crawler body so that the rail surfaces of the right and left outside rails form a rolling wheel track against which the outside collars of the rolling wheel are abutted.

Still further, it is recommended that the core bars for a rubber crawler are embedded in a rubber crawler body with the rail surfaces of the right and left outside rails exposed in a staggered arrangement on the inner circumferential surface of the rubber crawler body so that the rail surfaces of the right and left outside rails form a rolling wheel track against which the outside collars of the rolling wheel are abutted.

Still further, it is recommended that the rubber crawler body has rubber protrusions raised from the rail surface between the right and left outside rails adjacent to each other in the circumferential direction (in the lengthwise direction) of the crawler.

With this arrangement, when the rolling wheel is transferred from one rail surface to the next one, the rubber protrusions are elastically deflected to ensure a smooth transfer of the rolling wheel.

These and other objects and advantages of the present invention will be made clear by the following description of the preferred embodiments when consider together with the accompanying drawings.

BRIEF DESCRIPTION OF THE DRAWINGS

FIG. 14A shows a way in which a rolling wheel is transferred from one core bar to another core bar, and FIG. 14B shows its main part;

FIG. 15 is a lateral cross-sectional view of a rubber crawler, and

DETAILED DESCRIPTION OF THE PREFERRED EMBODIMENTS

The preferred embodiments of the present invention will be hereinafter described with reference to the accompanying drawings.

Figure 1:
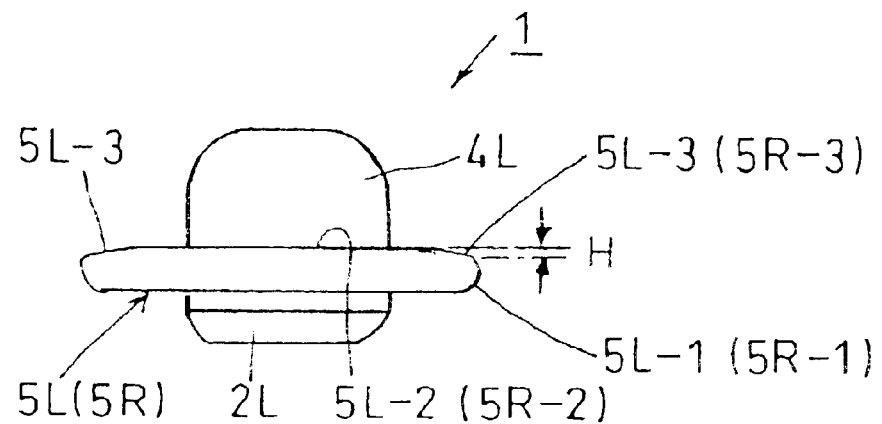
FIG. 1 is a side view showing a first embodiment of a core bar in accordance with the present invention.
Figure 2:
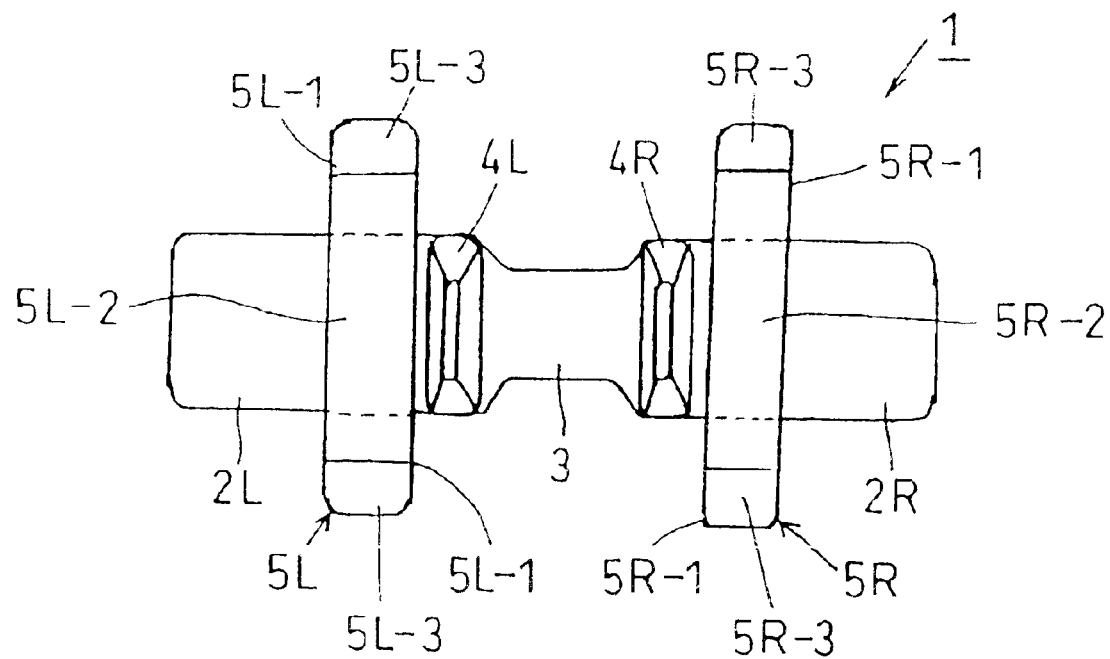
FIG. 2 is a plan view of FIG. 1.

FIG. 1 and FIG. 2 show a first embodiment of a core bar 1 for a rubber crawler in accordance with the present invention. The core bar 1 has right and left wing parts 2R, 2L that are formed in the shape of a plate or a belt and an engaging part 3 that connects the right and left wing parts 2R and 2L. On both the sides of the engaging part 3, protrusions 4R, 4L for guiding a rolling wheel are formed in a protruding manner. On both outer sides (right and left outsides) of the right and left protrusions 4R, 4L, right and left outside rails 5R, 5L having overhanging parts 5R-1, 5L-1 are formed to have a greater height than the right and left wing parts 2R, 2L in the thickness direction of the wing part.

The core bar 1 is formed of metal by the casting method or the forging method, or formed of metal or resin (preferably, with reinforced fiber) by the press-forming method.

In the core bar 1 of the first embodiment, the right and left outside rails 5R, 5L have flat rail surfaces 5R-2, 5L-2, respectively, on the upper surfaces (inner circumferential surfaces) thereof, and the overhanging parts 5R-1, 5L-1 extend exceeding the width of the right and left wing parts 2R, 2L toward both the front and the rear sides in a front-rear direction (in the lengthwise direction) of a crawler. The overhanging parts 5R-1, 5L-1 are formed on the end portions thereof with slanting surfaces 5R-3, 5L-3 which slant downward, preferably, in a downwardly curved manner from the rail surfaces 5R-2, 5L-2 by a height difference shown by a reference character H in FIG. 1, which are continuous with the rounded edges, and which in turn are continuous with the bottom surfaces of the outside rails.

Figure 11:
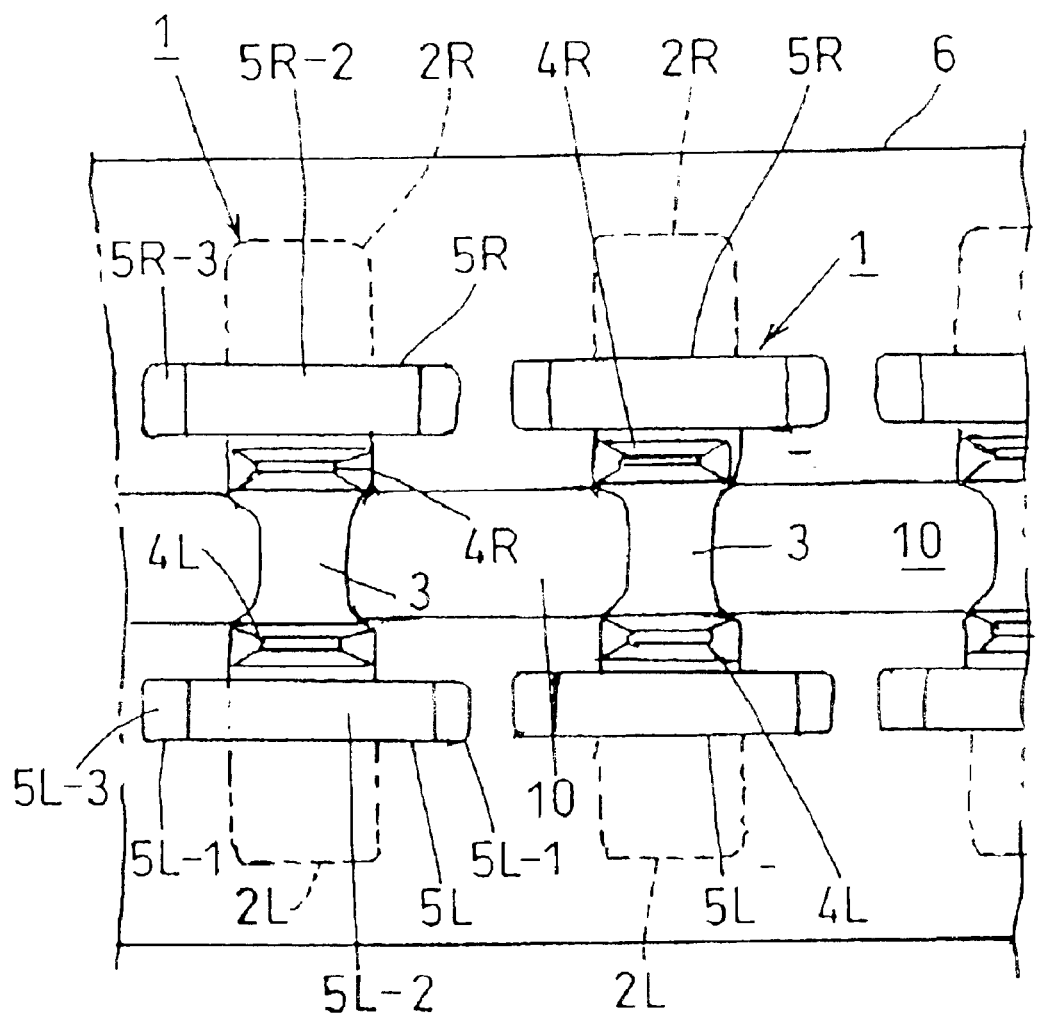
FIG. 11 is a plan view of a rubber crawler using the core bar of the first embodiment.

In the core bar 1 of the first embodiment, the rail surfaces 5R-2 and 5L-2 of the right and left outside rails 5R, 5L are equal in length and width to each other and, as shown in FIG. 11 and FIG. 15, the core bars 1 are embedded in a rubber crawler body 6 at intervals in the circumferential direction of the crawler.

In FIG. 11 and FIG. 15, the rubber crawler body (belt) 6 is formed in the shape of an endless belt that has running lugs 7 formed in a protruding manner on its outer circumferential surface, and the core bars 1 are arranged side by side such that their engaging parts 3 are positioned in the center of the width of the rubber crawler body 6, and the right and left wing parts 2R, 2L are embedded in the rubber such that the right and left protrusions 4R, 4L and the rail surfaces 5R-2, 5L-2 of the right and left outside rails 5R, 5L are exposed, respectively. In this manner, the rail surfaces 5R-2, 5L-2 of the outside rails 5R, 5L form a rolling wheel track against which the right and left collars 8R, 8L of an outside collar type rolling wheel 8 arc abutted when the rolling wheel 8 rolls.

In this respect, as shown in FIG. 15, endless tension belts 9R, 9L having tension cords are embedded in the rubber layer on the outer circumferential side of the right and left wing parts 2R, 2L, and as shown in FIG. 11, the engaging parts 3 of the core bars 1 define engaging windows 10 therebetween for receiving claws of a drive sprocket which are inserted into or extracted from the engaging window 10 to engage or disengage the valley portions between the claws with or from the engaging parts 3, thereby moving the rubber crawler body 6 in a circulating manner in the lengthwise direction of the crawler.

Figure 3:
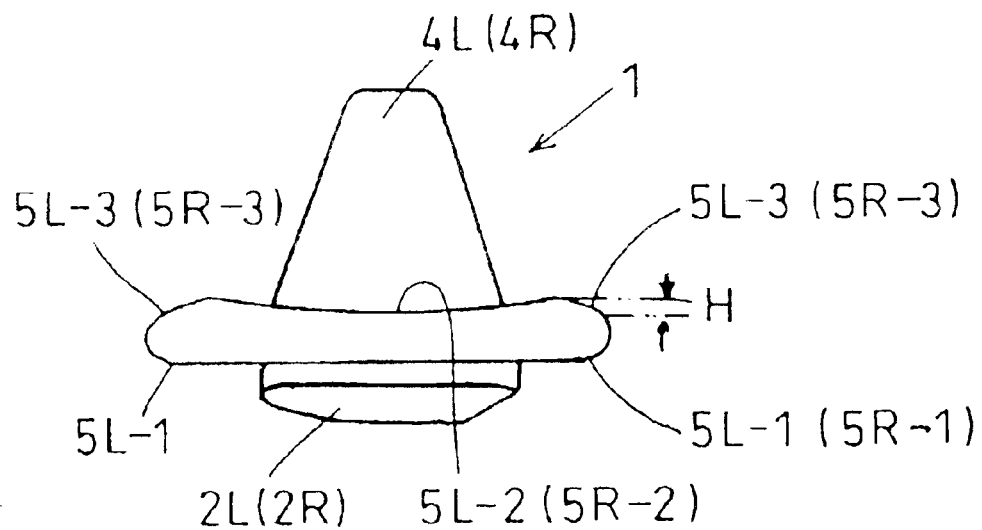
FIG. 3 is a side view showing a second embodiment of a core bar in accordance with the present invention.

FIG. 3 shows a second embodiment of the core bar 1 in accordance with the present invention. Since the second embodiment shares the same fundamental constitution with the first embodiment, the common parts are denoted by the common reference characters and different points between the first and the second embodiments will be hereinafter described in detail.

In FIG. 3, each of the rail surfaces 5R-2, 5L-2 of the right and left outside rails 5R, 5L is formed in a concave surface that slants upward from the center in the widthwise direction of the wing part to opposite ends of the rail surfaces in the lengthwise direction of the crawler, and also in this core bar 1, the outside rails 5R, 5L are equal in length and width to each other and, as shown in FIG. 11, the core bars 1 are embedded side by side in the crawler body 6.

Figure 4:
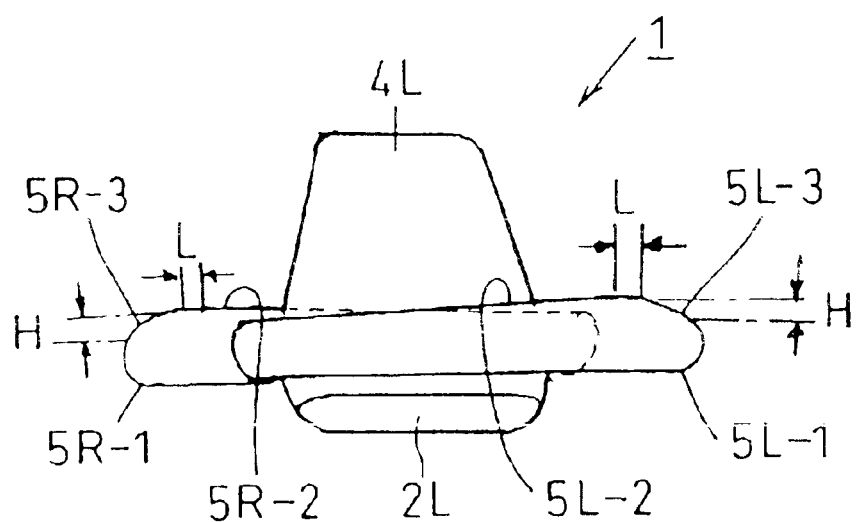
FIG. 4 is a side view showing a third embodiment of a core bar in accordance with the present invention.
Figure 5:
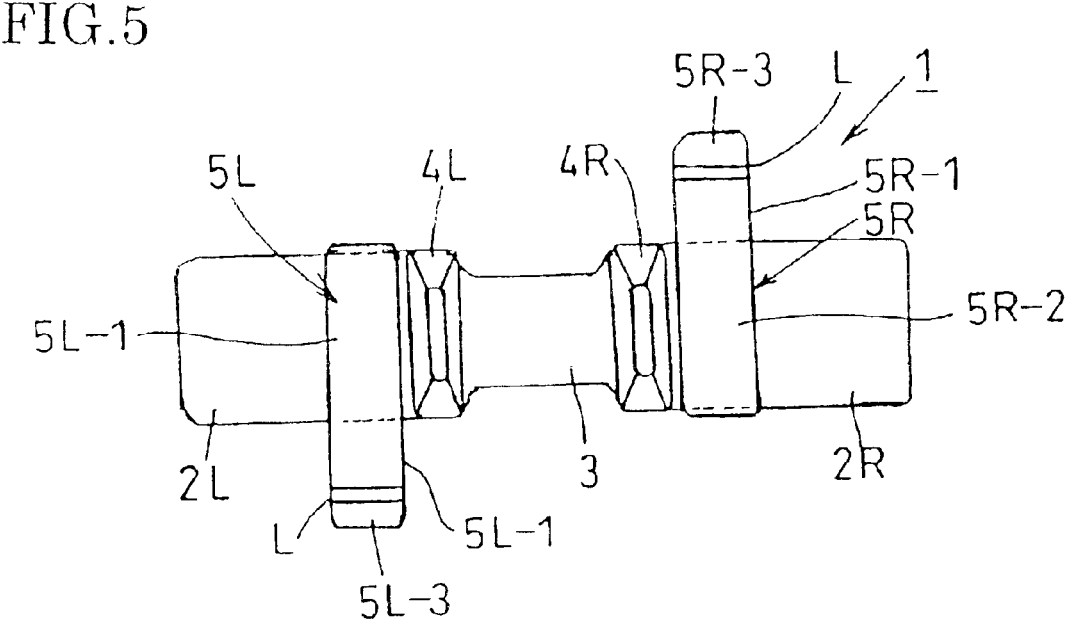
FIG. 5 is a plan view of FIG. 4.

FIG. 4 and FIG. 5 show a third embodiment of the core bar 1 in accordance with the present invention. The parts common to the first embodiment described above are denoted by the common reference characters and different points between the first and the third embodiments will be hereinafter described in detail.

In FIG. 4 and FIG. 5, the right and left outside rails 5R, 5L have overhanging parts 5R-1, 5L-1, respectively, only on the front side or the rear side in the widthwise direction of the wing part, and the overhanging parts 5R-1 and 5L-1 are extended on the opposite sides to each other (in FIG. 5, the right outside rail 5R is extended on the front side, and the left outside rail 5L is extended on the rear side, respectively). Further, each of the right and left rail surfaces 5R-2, 5L-2 is formed by a flat surface that slants upward from one rail end (front end or rear end) toward the other end of the rail (rear end or front end).

In the example shown in FIG. 4, when viewed from the side, the right and left rail surfaces 5R-2, 5L-2, are crossed at the center in the widthwise direction of the wing parts 2R, 2L, and in the overhanging parts 5R-1, 5L-1, each of the rail surfaces 5R-2, 5L-2 is continuous with each of slanting surfaces 5R-3, 5L-3 via a flat surface shown by a reference character L.

Figure 12:
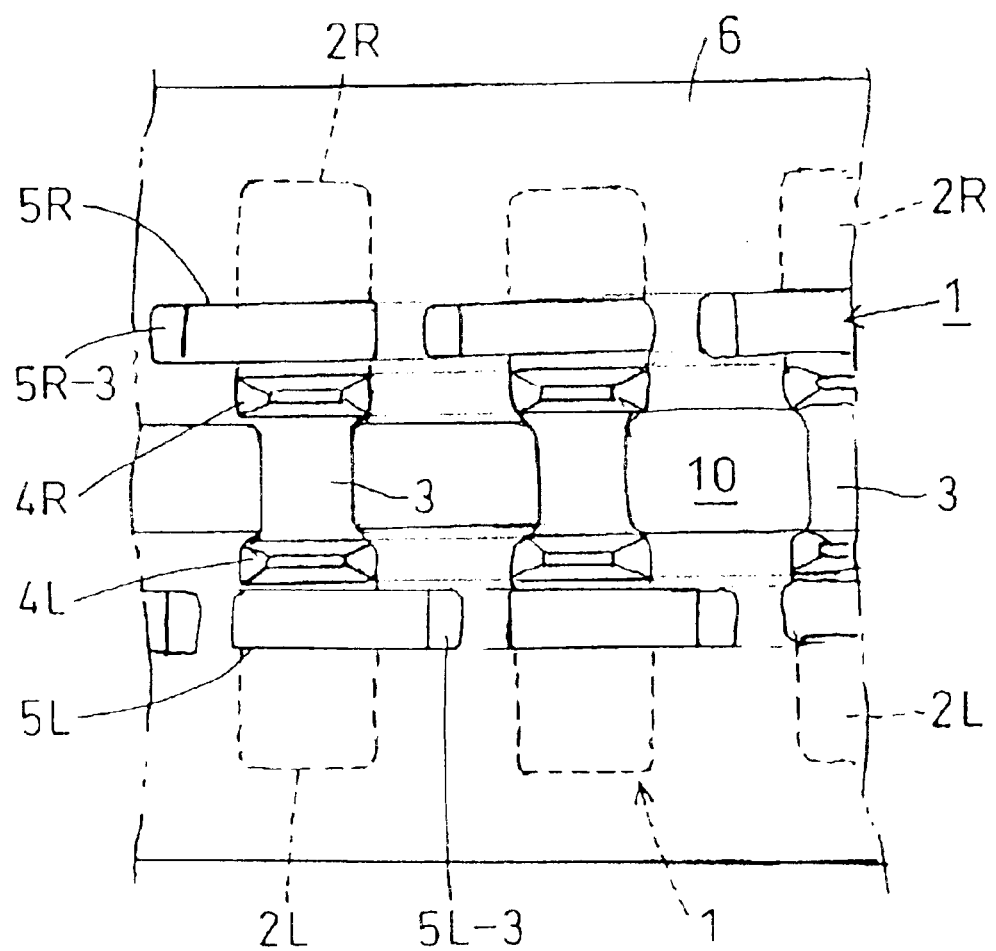
FIG. 12 is a plan view of a rubber crawler using the core bar of the third embodiment.

The core bars 1 of the third embodiment shown in FIG. 4 and FIG. 5 are arranged side by side on the belt-shaped rubber crawler body 6, as shown in FIG. 12, such that the right and left outside rails 5R, 5L are provided in a staggered arrangement in the right and left sides of the widthwise direction of the crawler, and the wing parts 2R, 2L are embedded in the rubber. Here, when viewed from the side, the rail surfaces 5R-2, 5L-2 including the slanting surfaces 5R-3, 5L-3 of the right and left outside rails 5R, 5L overlap each other, to constitute a rolling wheel track that is substantially continuous in the lengthwise direction of the crawler, thereby not only preventing a collision but also ensuring a smooth running performance by supporting the outside collars 8R, 8L with one of the right and left tracks when the rolling wheel is transferred to the next rail surface.

The slanting surfaces 5R-3, 5L-3 on the edge portions of the overhanging parts 5R-1, 5L-1 extending from the wing parts, which receive the outside collars 8R, 8L of the rolling wheel 8 transferred from previous rail surfaces, preferably slant substantially downward from the rail surfaces 5R-2, 5L-2 and outward in the front-rear direction, and are curved to form an outwardly convex surface, thereby ensuring smooth transfer of the outside collars 8R, 8L to the next rail surfaces.

Figure 6:
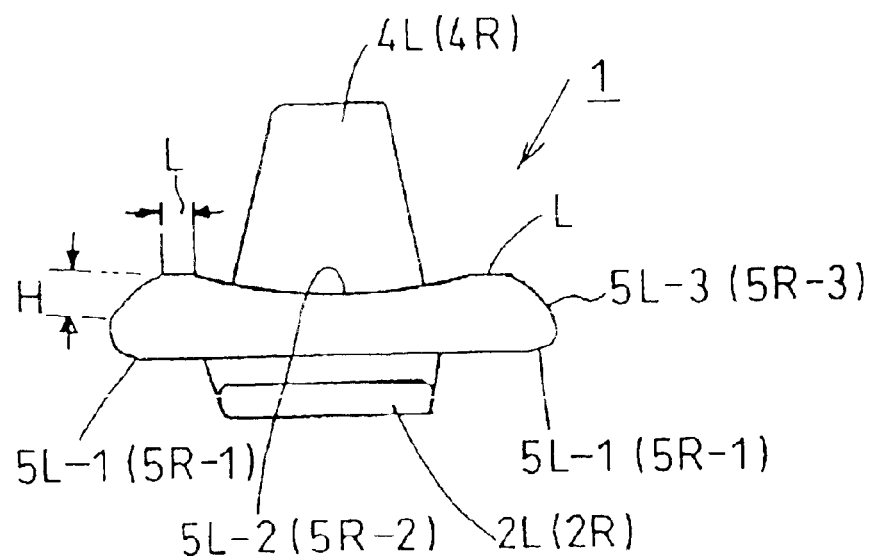
FIG. 6 is a side view showing a modification of the first embodiment.

The core bar 1 shown in FIG. 6 is a modification of the second embodiment described above with reference to FIG. 3. The right and left rail surfaces 5R-2, 5L-2, each formed by a concave surface, are continuous with the downwardly slanting surfaces 5R-3, 5L-3 formed on the edge portions of the overhanging parts 5R-1, 5L-1 in the front-rear direction via flat surfaces L, and the core bars 1 shown in FIG. 6 are also embedded in the rubber crawler body 6 in the state shown in FIG. 11. Between the rail surfaces 5R-2, 5L-2 and the slanting surfaces 5R-3, 5L-3 are formed flat surfaces L, respectively.

Figure 7:
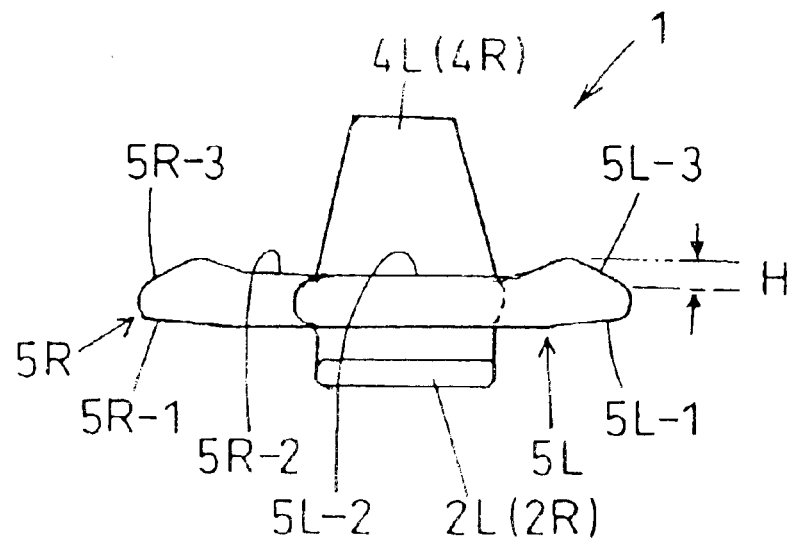
FIG. 7 is a side view showing a modification of the second embodiment.

The core bar 1 shown in FIG. 7 is a modification of the third embodiment described above with reference to FIG. 4 and FIG. 5. The right and left rail surfaces 5R-2, 5L-2 are formed by flat surfaces within the width of the wing parts 2R, 2L, and the rail surfaces of the overhanging parts 5R-1, 5L-1 extending on the opposite sides are formed nearly in the shape of a hill having an upward slow slope and a downward slow slope. The core bars 1 shown in FIG. 7 are also embedded in the crawler body 6 in the arrangement shown in FIG. 12.

Figure 10:
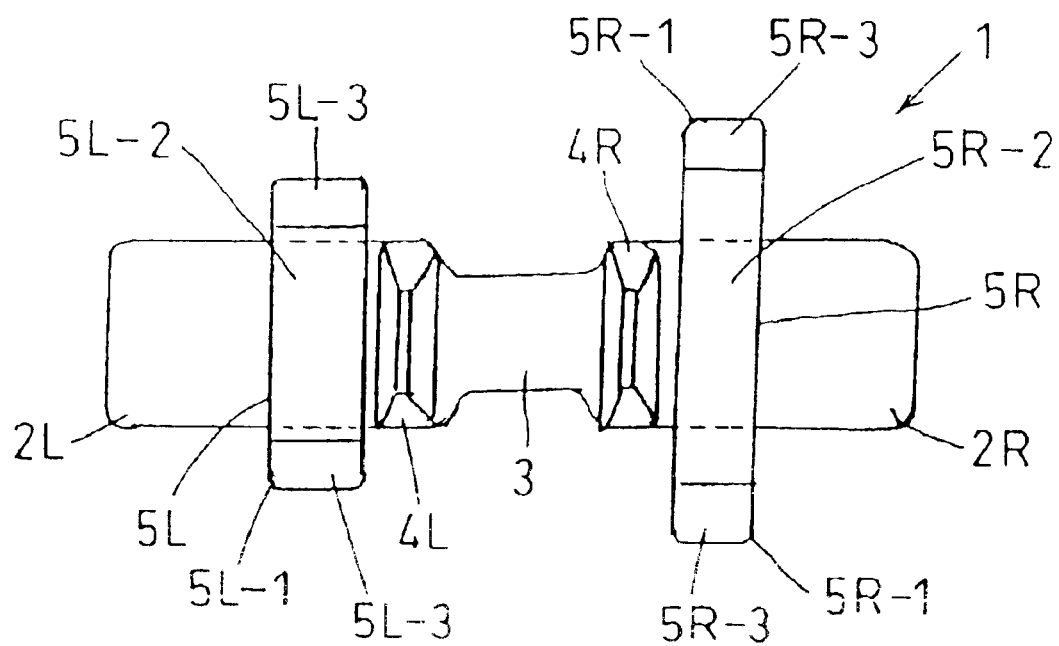
FIG. 10 is a plan view showing a fourth embodiment of a core bar in accordance with the present invention.

FIG. 10 shows the core bar 1 of a fourth embodiment in accordance with the present invention. The fundamental constitution thereof is the same as that of the first to third embodiments described above, so that common parts are denoted by the common reference characters and different points between the fourth embodiment and the other embodiments will be hereinafter described in detail.

According to this embodiment, overhanging parts 5R-1 and 5L-1 of the right and left outside rails 5R, 5L extending in the front-rear direction are different in overhanging amount from each other, that is, the overhanging amount of the overhang part 5R-1 of the outside rail 5R is larger (longer) than that of the overhang part 5L-1 of the outside rail 5L, as shown in FIG. 10. Therefore, the rail surfaces 5R-2 and 5L-2, including the overhanging parts 5R-1, 5L-1, of the right and left outside rails 5R, 5L are substantially equal in rail width to each other but are different in length from each other (in FIG. 10, the rail surface 5R-2 is longer than the rail surface 5L-2).

Figure 13:
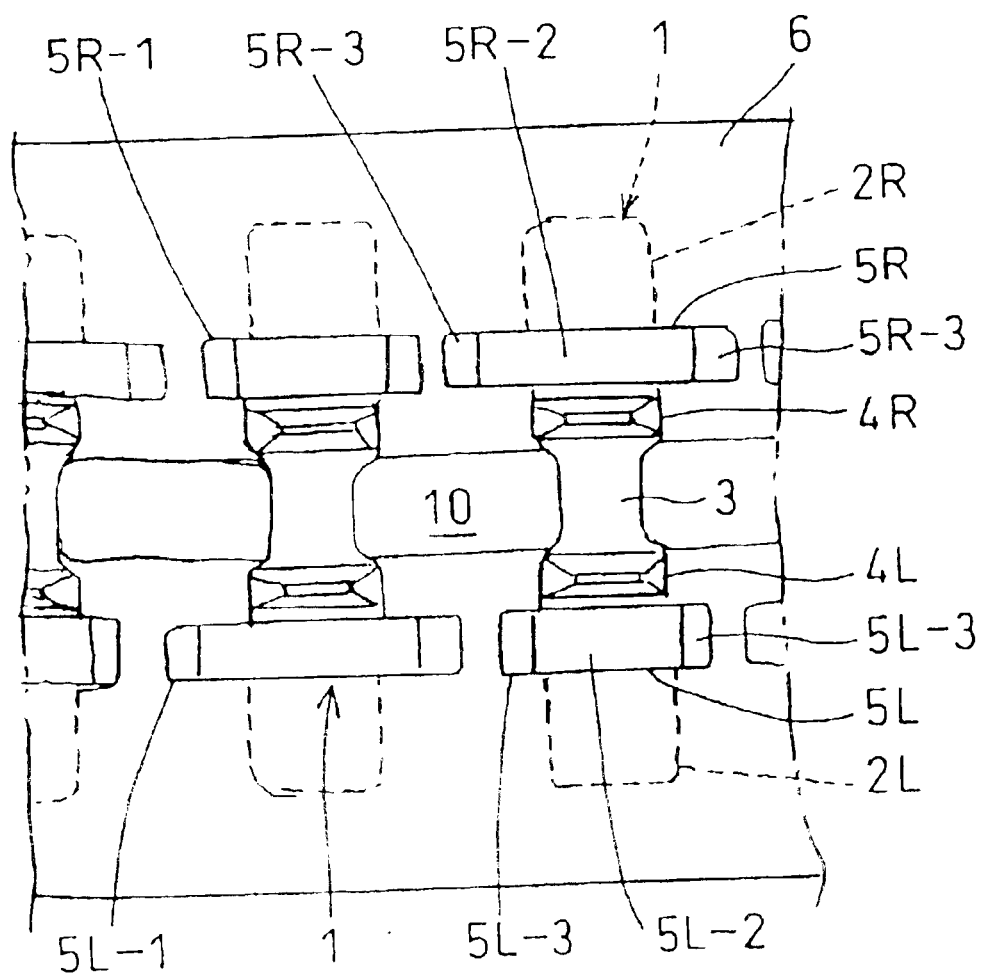
FIG. 13 is a plan view of a rubber crawler using the core bar of the fourth embodiment.

The core bars 1 shown in FIG. 10 are embedded side by side in the rubber crawler body 6 such that the right and left outside rails 5R, 5L are staggered on the right and left sides, as shown in FIG. 13. Here, the right and left rail surfaces 5R-2, 5L-2 overlap each other at the adjacent portions, when viewed from the side, to constitute a rolling wheel track that is substantially continuous in the lengthwise directing of the crawler, as is the case shown in FIG. 12.

Figure 8:
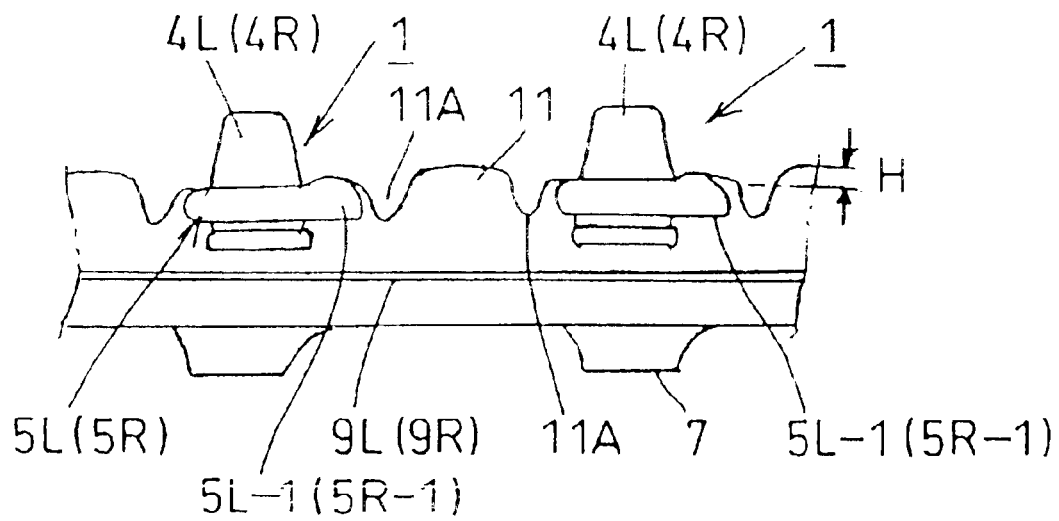
FIG. 8 is a cross-sectional view showing an embodiment of a rubber crawler in accordance with the present invention.
Figure 9:
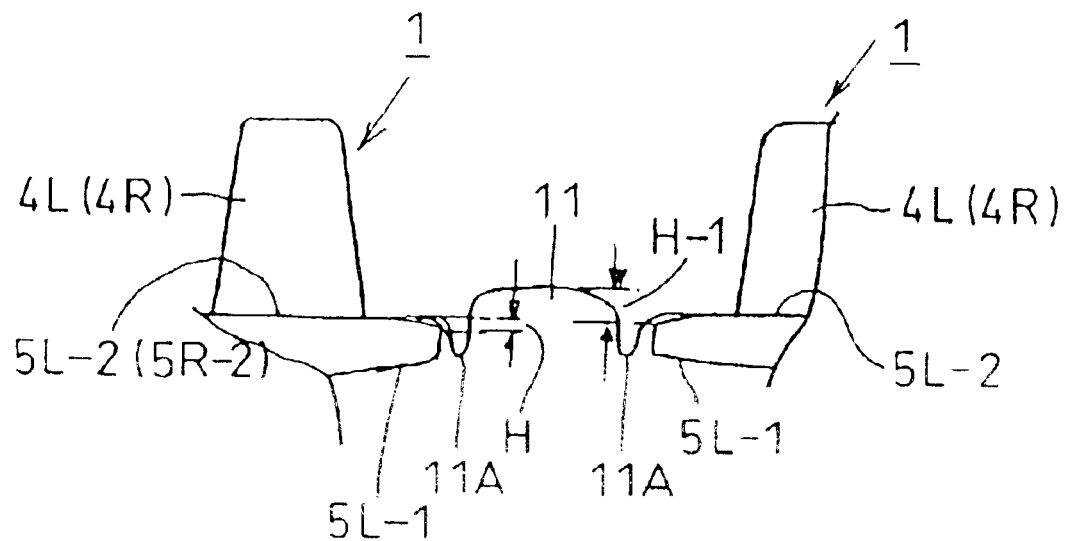
FIG. 9 is a cross-sectional view showing another embodiment of a rubber crawler in accordance with the present invention.

FIG. 8 is a cross-sectional view of a rubber crawler in which the core bars 1 shown in FIG. 7 are embedded in the rubber crawler body 6, while FIG. 9 is a cross-sectional view of the rubber crawler in which the core bars 1 shown in FIG. 1 are embedded in the rubber crawler body 6. In both cases, a rubber protrusion 11 is formed such as to be raised from the rubber crawler body 6 between the outside rails 5R, 5L of the core bars 1 adjacent in the circumferential direction of the crawler, and to have a greater height by a height difference H-1 than the rail surface.

In the case where the rubber protrusions 11 are formed in the above manner, when the outer collars 8 of the rolling wheels are transferred to the next rail surfaces of the right and left outside rails 5R, 5L, the shock-absorbing effect of the resilient rubber protrusions 11 can reduce vibrations.

In the case where the rubber protrusions 11 are formed with depressed portions (trenches) 11A at the front and the rear of the root portions of the rubber protrusions 11, when the rubber crawler body 6 is engaged with drive sprockets and the like, the depressed portions 11A can ensure a smooth bending performance and advantageously avoid stress concentration.

The motion (behavior) of the core bar 1 in accordance with the present invention during a transfer of the rolling wheel 8 from one rail surface to the next rail surface will be described, comparing with a core bar 1' in the related art with reference to FIGS. 14A, 14B and FIG. 16.

Figure 16:
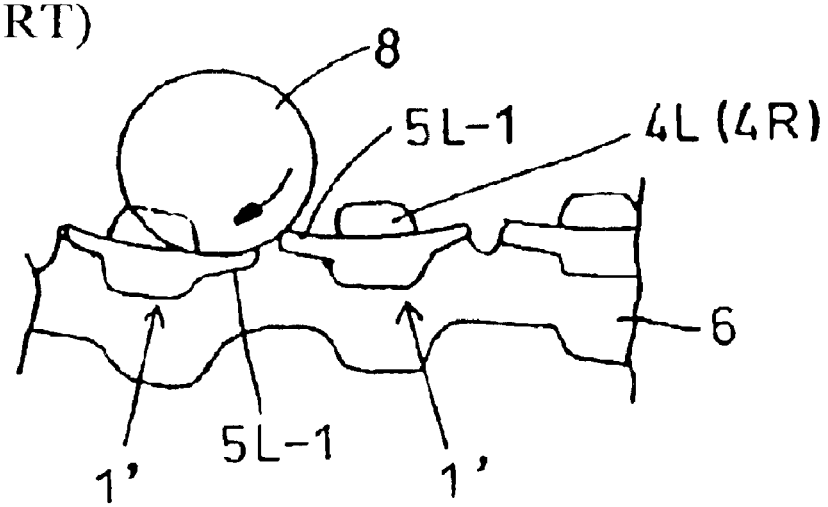
FIG. 16 is a side view showing an embodiment in the related art.

FIG. 16 shows an example in the related art, in which when the rolling wheel 8 is transferred from the overhanging part 5L-1 of the core bar 1' to the next one, the overhanging part 5L-1 is sunk and thus the rolling wheel 8 collides with the next overhanging part 5L-1 (in FIG. 14B, the contour of the edge portion of the overhanging part 5L-1 of the core bar 1' is shown by the dotted line, and a reference character A on the dotted line denotes a collision point between the rolling wheel 18 and the core bar).

In contrast, as shown in FIGS. 14A, 14B, when the rolling wheel 8 is transferred from the overhanging part 5R-1, 5L-1 of the core bar 1 in accordance with the present invention to the next ones, the slanting surface 5L-3 is formed as shown by a solid line in FIG. 14B and the rolling wheel (outside collar) 8 collides with the slanting surface 5L-3 at a point B. In this manner, a height difference H2 with respect to A can substantially reduce collision noises as compared with the related art (collision point A) even if the overhanging part is sunk.

It should be noted that the present invention is not limited to the preferred embodiments described above but can be variously modified. For example, the long and short rail surfaces shown in FIG. 10 may be formed in concavely curved surfaces.

What is claimed is:

1. A core bar for a rubber crawler, including: right and left wing parts; an engaging part for connecting the right and left wing parts; right and left protrusions formed on opposite sides of the engaging part to guide a rolling wheel; and right and left outside rails disposed on outer sides of the right and left protrusions with respect to a center of the core bar in the lengthwise direction thereof, respectively, each of the outside rails having an overhanging part extending in the widthwise direction of the wing part, wherein the overhanging part is formed with an edge portion that extends from the wing part, the edge portion having an upper surface which slants substantially downward toward an end of the overhanging part from a top surface of the outside rail and a convexly curved end surface extending downward from said upper surface, so that an outside collar of a rolling wheel smoothly transfers to a next rail surface.

2. A core bar for a rubber crawler as set forth in claim 1, wherein each of the right and left outside rails has an overhanging part extending on both the front and the rear sides in the widthwise direction of the wing part, and wherein the overhanging parts of the right and the left outside rails are equal or different in length to or from each other, so that the right and the left outside rails are equal or different in length to or from each other.

3. A core bar for a rubber crawler as set forth in claim 1, wherein each of the rail surfaces of the right and left outside rails is formed, in the lengthwise direction of the rail, in a horizontally extending flat surface, in a flat surface slanting upward from one end of the rail to the other end thereof including the overhanging part, or in a concavely curved surface slanting upward from a center toward opposite ends of the rail.

4. A rubber crawler, wherein a core bar for a rubber crawler as set forth in claim 1 is embedded in a rubber crawler body with the rail surfaces of the right and left outside rails exposed on the inner circumferential surface of the rubber crawler body so that the rail surfaces of the right and left outside rails form a rolling wheel track against which the outside collars of a rolling wheel are abutted.

5. A rubber crawler, comprising:

a rubber crawler body; and a core bar including right and left wing parts; an engaging part for connecting the right and left wing parts; right and left protrusions formed on opposite sides of the engaging part to guide a rolling wheel; and right and left outside rails disposed on outer sides of the right and left protrusions with respect to a center of the core bar in the lengthwise direction thereof, respectively, each of the outside rails having an overhanging part extending in the widthwise direction of the wing part, the overhanging part being formed with an edge portion that extends from the wing part, the edge portion having an upper surface which slants substantially downward toward an end of the overhanging part from a top surface of the outside rail;

wherein the core bar is embedded in the rubber crawler body with rail surfaces of the right and left outside rails exposed on an inner circumferential surface of the rubber crawler body so that the rail surfaces of the right and left outside rails form a rolling wheel track against which an outside collar of a rolling wheel is abutted, and wherein the rubber crawler body has rubber protrusions raised from the rail surface between the right and left outside rails adjacent to each other in the circumferential direction of the crawler.

6. A rubber crawler comprising:

a rubber crawler body;

core bars embedded in the rubber crawler body at intervals along the circumferential direction thereof; and right and left tension belts embedded in the rubber crawler body on an outer circumferential side of the core bars, wherein the core bar has an engaging part for drive formed in a middle portion of the core bar in the lengthwise direction thereof; right and left protrusions for guiding a rolling wheel protruding toward an inner circumferential surface of the rubber crawler body on both right and left sides of the engaging part; right and left outside rails formed on outer sides of the right and left protrusions, respectively, with respect to the middle portion of the core bar in the lengthwise direction thereof; and right and left wing parts formed on further outer sides of the right and left outside rails, respectively, and wherein each of the right and left outside rails has an overhanging part extending at least one of the front and the rear sides in the widthwise direction-of the wing part; a rail surface formed on the top surface of the outside rail and exposed on the inner circumferential surface of the rubber crawler body, on which the outside collar of the rolling wheel rolls; and a convexly curved transfer surface formed on an edge portion of the overhanging part extending from the wing part in such a manner as to slant substantially downward from the rail surface to an outer end of the overhanging part in the widthwise direction of the wing part for a smooth transfer of the outside collars of the rolling wheel to the next rail surface.

7. A core bar for a rubber crawler as set forth in claim 2, wherein each of the rail surfaces of the right and left outside rails is formed, in the lengthwise direction of the rail, in a horizontally extending flat surface, in a flat surface slanting upward from one end of the rail to the other end thereof including the overhanging part, or in a concavely curved surface slanting upward from a center toward opposite ends of the rail.

8. A core bar for a rubber crawler as set forth in claim 1, wherein the outside rail has a concavely curved upper rail surface and a flat surface disposed between each end of the rail surface and the downwardly slanted upper surface.

9. A rubber crawler as set forth in claim 6, wherein the outside rail has a concavely curved upper rail surface and a flat surface disposed between each end of the rail surface and the downwardly slanted upper surface.

* * * * *